US010043072B2

(12) United States Patent
Scully et al.

(10) Patent No.: US 10,043,072 B2
(45) Date of Patent: Aug. 7, 2018

(54) IMAGE-CENTRIC, RELEVANCE-BASED DATABASE RETRIEVAL SYSTEMS

(71) Applicant: Bank of America Corporation, Charlotte, NC (US)

(72) Inventors: John E. Scully, Chicago, IL (US); Scott A. Field, Stanley, NC (US); Jennifer N. Wheat, Chicago, IL (US); Anup Vappala, Concord, NC (US); Brittany S. Abisambra, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/396,708

(22) Filed: Jan. 2, 2017

(65) Prior Publication Data
US 2018/0053047 A1 Feb. 22, 2018

Related U.S. Application Data

(60) Provisional application No. 62/376,491, filed on Aug. 18, 2016.

(51) Int. Cl.
*G06K 9/62* (2006.01)
*G06K 9/00* (2006.01)
(Continued)

(52) U.S. Cl.
CPC ..... *G06K 9/00456* (2013.01); *G06F 17/3028* (2013.01); *G06F 17/3053* (2013.01);
(Continued)

(58) Field of Classification Search
None
See application file for complete search history.

(56) References Cited

U.S. PATENT DOCUMENTS 5,771,042 A * 6/1998 Santos-Gomez ..... G06F 3/0481
715/792
7,340,421 B1 3/2008 Marcial et al.
(Continued)

OTHER PUBLICATIONS

"Elasticsearch: The Definitive Guide [2.x]," Elastic, Retrieved on Aug. 9, 2016.
(Continued)

*Primary Examiner* — Ryan P Potts
(74) *Attorney, Agent, or Firm* — Weiss & Arons LLP; Michael A. Springs, Esq.

(57) ABSTRACT

Methods for providing relevance-based, image centric information are provided. The methods may include receiving an image. The methods include linking each received image to an appropriate selected standard format. The selection may be based on a greatest degree of relevance between the image and the selected format. The methods include converting each image into a linked standard format. The methods include loading the converted images into a database. The methods include searching the database utilizing a query. The methods include returning a plurality of resultant images in response to the query. The methods include determining a search relevance result value for each resultant image. The search relevance result value being based on the level at which the document fits the query. The methods include ordering the resultant images based on the search relevance result values. The methods include arranging the images and associated metadata on a four-regioned user interfacing display.

19 Claims, 10 Drawing Sheets

(51) Int. Cl.
*H04N 19/70* (2014.01)
*G06T 3/40* (2006.01)
*G06T 11/60* (2006.01)
*G06F 17/30* (2006.01)

(52) U.S. Cl.
CPC .......... *G06F 17/30247* (2013.01); *G06T 3/40* (2013.01); *G06T 11/60* (2013.01); *H04N 19/70* (2014.11)

(56) References Cited

U.S. PATENT DOCUMENTS

| | | | |
|---|---|---|---|
| 7,742,973 B2 | 6/2010 | Samsky et al. | |
| 8,209,394 B2 | 6/2012 | Guo et al. | |
| 8,738,513 B2 | 5/2014 | Ussery et al. | |
| 9,116,975 B2 | 8/2015 | Shankar et al. | |
| 2005/0044066 A1* | 2/2005 | Hooper | G06F 17/30265 |
| 2005/0213551 A1* | 9/2005 | Suzuki | H04N 1/2112 370/338 |
| 2006/0265417 A1* | 11/2006 | Amato | G06F 17/30864 |
| 2009/0254515 A1* | 10/2009 | Terheggen | G06F 17/3002 |
| 2011/0145753 A1* | 6/2011 | Prakash | G06F 3/0481 715/783 |
| 2014/0059017 A1 | 2/2014 | Chaney et al. | |
| 2014/0233830 A1* | 8/2014 | Bennett | G06F 17/3028 382/137 |
| 2014/0236791 A1* | 8/2014 | Palmer | G06Q 40/02 705/35 |
| 2014/0236929 A1 | 8/2014 | Xie | |
| 2015/0278902 A1 | 10/2015 | Warren et al. | |
| 2016/0034545 A1 | 2/2016 | Shankar et al. | |
| 2016/0140146 A1* | 5/2016 | Wexler | G06F 17/30253 707/741 |
| 2016/0196350 A1* | 7/2016 | Mau | G06F 17/30256 707/706 |

OTHER PUBLICATIONS

Video Screenshot retrieved from https://www.elastic.co/webinars/get-started-with-elasticsearch, Jun. 6, 2016.

* cited by examiner

```
  1 - {
  2 -   "TOOK": 7,
  3 -   "TIMED_OUT": FALSE,
  4 -   "SHARDS": {
  5 -     "TOTAL": 10,
  6 -     "SUCCESSFUL": 8,
  7 -     "FAILED": 2
  8 -   },
  9 -   "HITS": {
 10 -     "TOTAL": 7,
 11 -     "MAX_SCORE": 0.07633021,
 12 -     "HITS": [
 13 -       {
 14 -         "_INDEX": "BANKING",
 15 -         "_TYPE": "ACCOUNTS RECEIVABLE",
 16 -         "_ID": "26000579",
 17 -         "_SCORE": 0.07633021,
 18 -         "_SOURCE": {
 19 -           "PAYEE": "ABC CORPORATION",
 20 -           "AMOUNT": 101.00"
 21 -         }
 22 -       },
 23 -       {
 24 -
 25 -
 26 -
 27 -
 28 -
 29 -         "_INDEX": "BANKING",
 30 -         "_TYPE": "ACCOUNTS RECEIVABLE",
 31 -         "_ID": "34000555",
 32 -         "_SCORE": 0231126,
 33 -         "_SOURCE": {
 34 -           "PAYEE": "ACC CORP.",
 35 -           "AMOUNT": 98.50
 36 -         }
 37 -       },
 38 -
 39 -
 40 -
 41 -     ]
 42 -   }
```

408

402

```
134 -
135 -
136 -
137 -
138 -
139 - GET /BANKING/ACCOUNTSRECEIVABLE_SEARCH
140 - {
141 -   "QUERY": {
142 -     "BOOL": {
143 -       "BOOST": 10
144 -       "SHOULD": [{
145 -
146 -         "MATCH_PHRASE": {
147 -           "PAYEE": {
148 -             "QUERY": "ABC CORPORATION"
149 -             "BOOST": 2
150 -           }
151 -         },
152 -         {
153 -           "MATCH_INT": {
154 -             "AMOUNT": {
155 -               "QUERY": "100.00"
156 -             }
157 -           }
158 -         }
159 -
160 -
161 -
162 -
163 -
164 -
165 -
166 -
167 -
168 -
169 -
170 -
171 -
172 -
173 -
174 -       ]
175 - }
```

IMAGE-CENTRIC, RELEVANCE-BASED DATABASE RETRIEVAL SYSTEMS

CROSS-REFERENCE TO RELATED APPLICATION

This application claims priority from prior U.S. Provisional Patent Application No. 62/376,491, filed on Aug. 18, 2016, which is hereby incorporated by reference herein in its entirety.

FIELD OF TECHNOLOGY

This invention relates to database retrieval systems. More specifically, this invention relates to retrieving image-centric data in a relevance-based manner.

BACKGROUND OF THE DISCLOSURE

In database retrieval systems, query results are often presented in complex formats. Accordingly, deciphering such results can be time- and resource-consuming. Also, query results, including image metadata, may typically not be viewable side-by-side with images from which the metadata was retrieved. It would be desirable to view query metadata, images and thumbnails of the images on a graphical user interface. It would also be desirable to view images in a display that designates a column for result filtering, image thumbnails, full-scale images and image metadata.

SUMMARY OF THE DISCLOSURE

A method for providing relevance-based image-centric information is provided. The method may include receiving a plurality of images. The method may include linking each received image to an appropriate standard format. The appropriate standard format may be selected from a plurality of standard formats. The selection may be based on a greatest degree of relevance between the image and the selected one of the plurality of formats. The linking may be based at least in part on a length and width of the image.

In an exemplary scenario, a received image may have a length of 9.5 inches and a width of 5.5 inches. The plurality of standard formats may include 8.5 inches by 11 inches, 9 inches by 12 inches, 5 inches by 4 inches and 10 inches by 5 inches. The method may determine a best fit for the received image. In this exemplary scenario, the best fit may be the 10 inch by 5 inch standard format. Therefore, the method may conform or convert the received image into the 10 inch by 5 inch size. Such conforming or converting may preferably preserve, to the extent possible, the integrity of the received image. In certain embodiments, the conversion may include cropping the image, elongating the image, compressing the image or taking any other suitable action with, or on, the image in order to make the received image conform to the standard format.

The method may include converting each of the received images into a linked standard image. The linked standard image may correspond to the appropriate standard format with a higher degree of correspondence than the received image. Converting the image may include resizing the image to conform to the appropriate standard format. Converting the image may also include adjusting the image quality to conform to the appropriate standard format. Converting the image may also include adjusting the image coloring to conform to the appropriate standard format.

The method may also include loading the plurality of converted images into a database. The method may also include searching the database for the results of a query. The query may be a structured query. The query may be a natural language query. The query may be an ELASTIC SEARCH® query. The query may be any other suitable query.

The method may also include returning a plurality of resultant images in response to the query. The images may include, or be associated with, metadata. In certain embodiments, the resultant images were preferably returned based on relevance to the query.

The method may include determining a search relevance result value for each resultant image. The search relevance result value may be based on how well the document fits the query. For example, a quantitative metric may be assigned to how well the document fits the query. A quantitative level be obtained using quantitative calculation methods for determining relevance. The most relevant may be ranked highest and the least relevant may be ranked lowest or vice versa.

The method may include ordering the resultant images based on the search relevance result. In some embodiments, the metadata may include information from which the relevance was based.

The method may include loading the images onto a user interfacing display. A first set of the plurality of the images may be displayed on the display. The displaying may be prior to loading of all of the plurality of images. The display may appear to have loaded resultant images that are not included in the first set. At least a portion of the resultant images that are not included in the first set may be in the process of being loaded at the time the first set is being displayed.

The method may include arranging the images on the user interfacing into a plurality of regions. The plurality of regions may include an image thumbnail region, a full-scale image region, an image metadata region and/or a filter results region. The image thumbnail region may include thumbnail images of the resultant images. The full-scale image region may include full-size views of the images. The image metadata region may include metadata about the images. The filter results region may include methods for narrowing results of the query.

The method may further include performing a screen compression algorithm. The screen compression algorithm may be based on a screen size of the user interfacing display. The screen compression algorithm may be in order to accommodate the images and the associated metadata. The screen compression algorithm may be based on priority of the regions. The screen compression algorithm may include the following plurality of steps in the following sequences.

A) shrinking the filter results region,
removing the filter results region,
shrinking the image metadata region,
removing the image metadata region,
shrinking the full-scale image region,
removing the full-scale image region, and
shrinking the image thumbnail region.
B) shrinking the filter results region,
shrinking the image metadata region,
shrinking the full-scale image region,
shrinking the image thumbnail region,
removing the filter results region,
removing the image metadata region, and
removing the full-scale image region.

In other embodiments, the screen compression algorithm may include performing the above-described plurality of steps in any other suitable sequence.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an illustrative programming interface in accordance with principles of the invention;

FIG. 9 shows yet another GUI in accordance with principles of the invention.

DETAILED DESCRIPTION OF THE DISCLOSURE

Aspects of the invention relate to providing relevance-based image-centric information.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
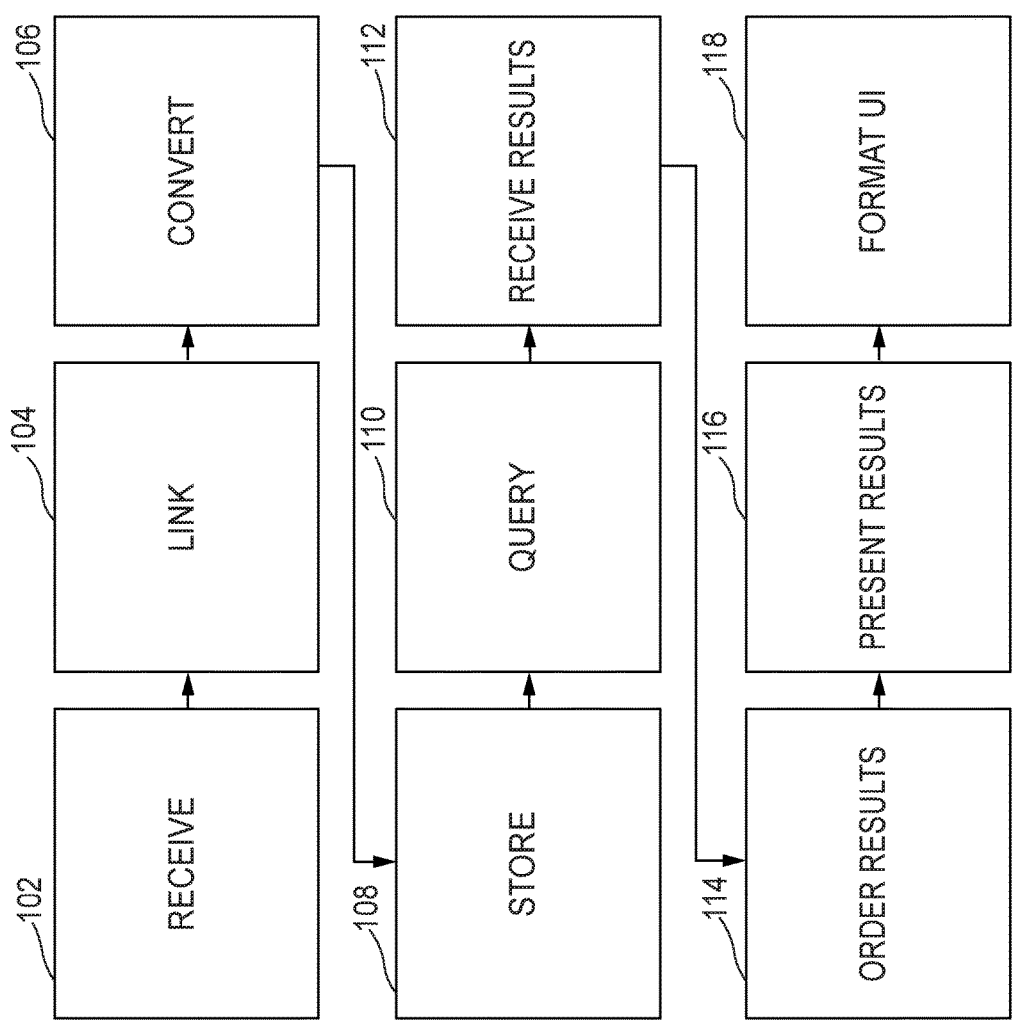
FIG. 1 shows an illustrative flow chart in accordance with principles of the invention.

FIG. 1 shows an illustrative flow chart. Step 102 shows an apparatus may provide receiving capability. At step 102, the apparatus may receive data at a database. The data may be an image. The image(s) may include receipts, checks, invoices, ACHs (Automated Clearing House), wire transfers and/or any other suitable data.

Step 104 shows the apparatus may provide a linking capability. At step 104, the apparatus may link each of the received data, or images to a standard format.

Step 106 shows the apparatus may provide a converting capability. At step 106, the apparatus may convert each received data element to a standard image. The standard image may be based on the standard format that was linked to the data element, as shown in step 104.

Step 108 shows the apparatus may provide a storing capability. At step 108, the apparatus may store the converted data elements in a database.

Step 110 shows the apparatus may provide a querying capability. At step 110, the apparatus may transmit a query to the database for a specific subset of data.

Step 112 shows the apparatus may provide a receiving results capability. At step 112, the apparatus may receive results in response to the query transmitted in step 110.

Step 114 shows the apparatus may provide an ordering results capability. At step 114, the results may be ordered by alphabetical order, numerical order, relevance order, date order, time order or any other suitable order.

Step 116 shows the apparatus may provide a presenting results capability. At step 116, the results may be presented in a variety of formats. The results may be emailed to a user. The results may be displayed to a user on a user interface ("UI"). The user interface may be a graphical user interface. The user interface may be a command-line interface. The user interface may be any other suitable user interface. The results may be presented to the user in any other suitable manner.

Step 118 shows the apparatus may provide a capability for formatting the UI.

Figure 2:
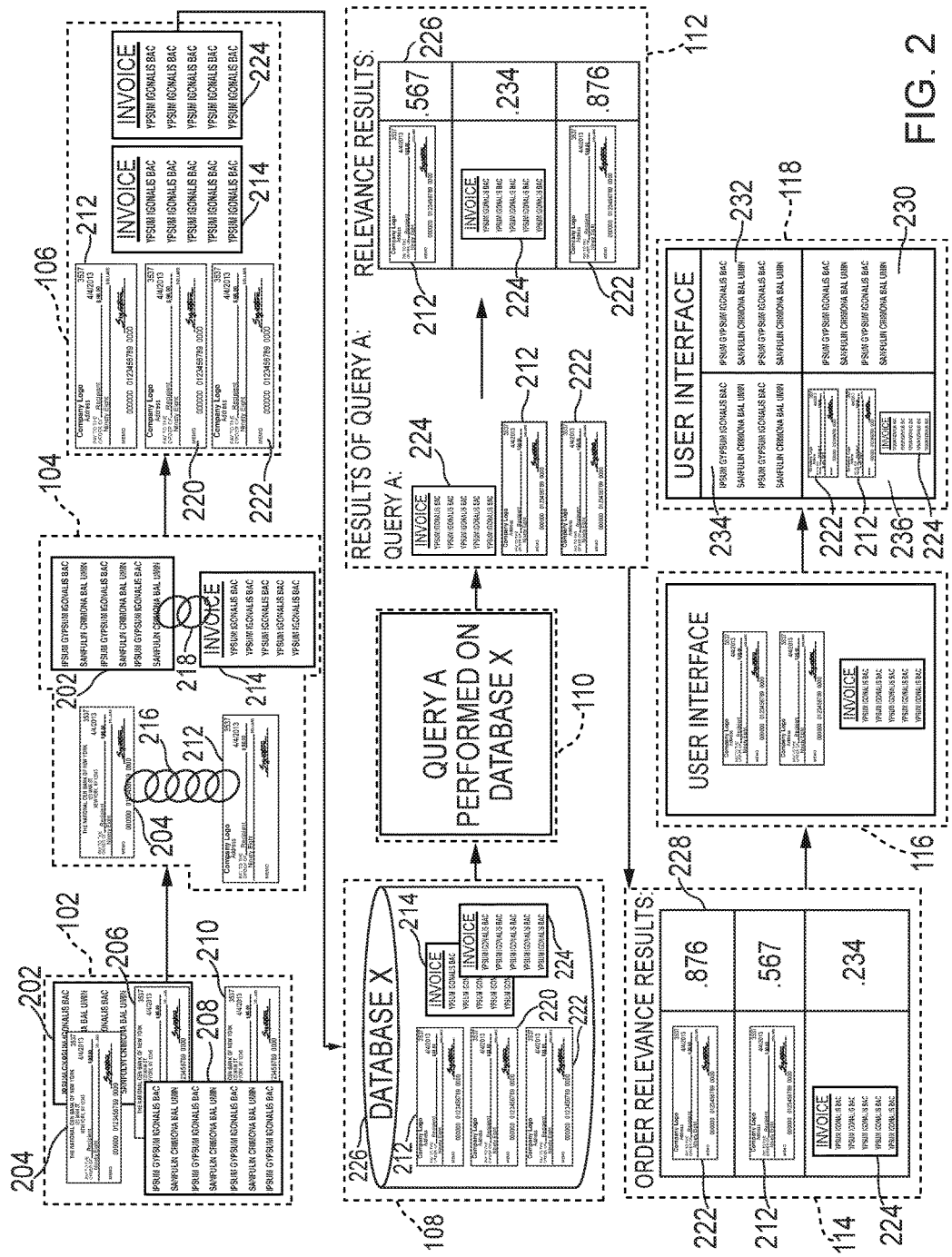
FIG. 2 shows another illustrative flow chart in accordance with principles of the invention.

FIG. 2 shows another illustrative flow chart. Step 102, also shown in FIG. 1, shows receiving images. The images may include invoice 202, check 204, check 206, invoice 208 and/or check 210.

Step 104 shows linking, also shown in FIG. 1. Check 204 may be linked, using link 216, to standard format 213. Link 216 may determine and/or select a format from a plurality of standard formats with which to link to check 204. The determination of the format with which to link check 204 may be based on a number of factors. One of the factors may be the length and/or width of check 204. Another factor may be the type of image—i.e., a check. Another factor may be the amount of megabytes of the image—i.e., the check. There may be many other suitable factors that may enable link 216 to determine a standardized format. In some instances, standard format 213 may be a standard format for a bank size check scanned between a range 4 and 6 megabytes.

Invoice 202 may be linked, using link 218, to standard format 215. Link 218 may determine a format from a plurality of standard formats with which to link to invoice 202. The determination of the format with which to link invoice 202 may be based on a number of factors. One of the factors may be the length and/or width of invoice 202. Another factor may be the type of the image—i.e., an invoice. Another factor may be the amount of megabytes of the image—i.e., the invoice. There may be many other suitable factors that may enable link 218 to determine a standardized format. In some instances, standard format 215 may be a standard format for an 8½ by 11 inch paper invoice, such a format when scanned, may produce a file of between a range of 2 and 4 megabytes.

Step 106 shows converting of received images into standard images. The standard images may be based on the linking, which occurred in step 104. Check 204 may be converted into standard check image 212. Check 206 may be converted into standard check image 220. Check 210 may be converted into standard check image 222. Invoice 202 may be converted into standard invoice image 214. Invoice 208 may be converted into standard invoice image 224.

Step 108 shows storing of standard check images 212, 220 and 222 in database X 226. Step 108 also shows storing of standard invoice images 214 and 224 in database X 226.

Step 110 shows a query being performed on database X. The query may search the database for specific results. The query may be a SQL (Structured Query Language) query. The query may be a SOLR TM query. The query may be an ELASTICSEARCH® query. The query may be any other suitable query. The query may limit the returned results by specific parameters. For example, the query may limit the results of the search to a check from ABC Corporation in the amount of one hundred dollars. The search may return results that are similar to the query's limitations. For example, the returned results may include a check from ABBD Corporation in the amount of one hundred and one dollars.

Step 112 shows receiving the results received from query A. The results may include standard invoice image 224, standard check image 212 and standard check image 222. Each resultant image may include a relevance metric, shown at column 226. The relevance metric may inform how relevant the resultant image is to query X. Standard check image 212 may have a relevance metric of 0.567. Standard invoice image 224 may have a relevance metric of 0.234. Standard check image 222 may have a relevance metric of 0.876.

Step 114 shows ordering the results received from query A based on the relevance metric. Standard check image 222 may have the highest relevance of 0.876. Therefore, standard check image 222 may be placed on the top of the relevance result list. Standard check image 212 may have the next relevance of 0.567. Therefore, standard check image 212 may be placed after standard check image 222. Standard invoice image 224 may have a relevance of 0.234. Therefore, standard invoice image 224 may be placed next on the list.

Step 116 shows resultant standard images 222, 212 and 224, being displayed on a user interface. Resultant standard images 222, 212 and 224 may be ordered on the user interface based on the result metric, as shown in step 114.

Step 118 shows the user interface may be divided into sections 230, 232, 234 and 236. Each section may include different information elements. For example, section 236 may include full size images of standard images 222, 212 and 224. Section 234 may include thumbnails of standard images 222, 212 and 224. Section 232 may include metadata of standard images 222, 212 and 224. Section 230 may include a results filtering tool for filtering the results received in response to query A.

Figure 3:
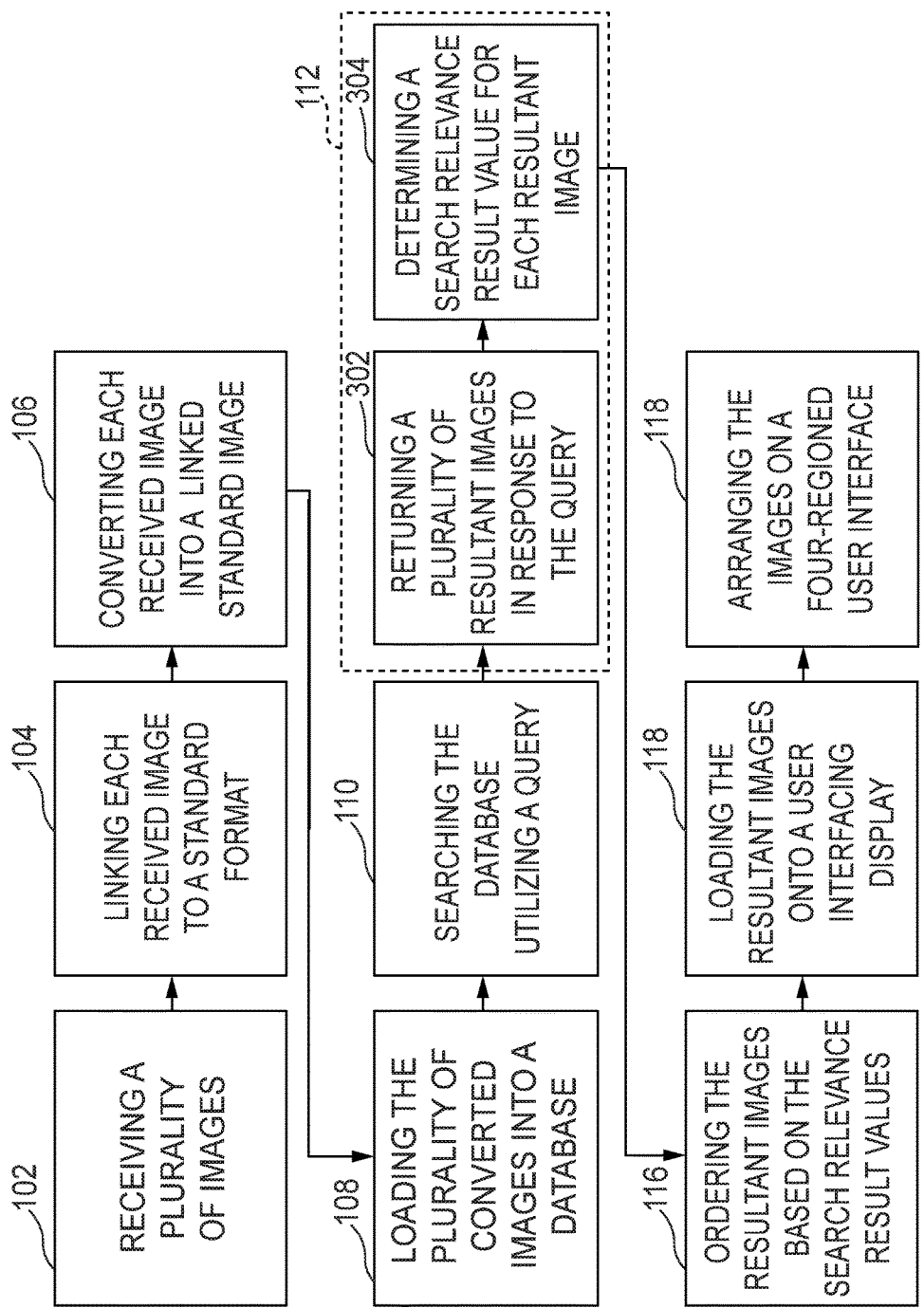
FIG. 3 shows yet another illustrative flow chart in accordance with principles of the invention.

FIG. 3 shows an illustrative flow chart. Step 102 shows receiving a plurality of images. Step 104 shows linking each received image to a standard format. Step 106 shows converting each received image into a linked standard image. Step 108 shows loading the plurality of converted images into a database. Step 110 shows searching the database utilizing a query.

Step 112 may include two sub-steps, step 302 and step 304. Step 302 shows returning a plurality of resultant images in response to the query. Step 304 shows determining a search relevance result value for each resultant image. It should be appreciated that the determination of a search relevance result value may occur prior to, simultaneous to, or after the return of the images in response to the query.

Step 114 shows ordering the resultant images based on the search relevance result values. It should be appreciated that, in other embodiments, the ordering may be based on any other suitable criterion. For example, the ordering may be based on a date associated with the image. The ordering may also be based on a size of the image. The ordering may also be based on a combination of criterion. The ordering may be based on any other suitable criteria.

Step 116 shows loading the resultant images onto a user interface. The user interface may be a display. Step 118 shows arranging the images on a four-regioned user interface. It should be appreciated that the user interface may have any other suitable amount of regions, for example, 2, 3, 5, 10, 15, 20 etc.

FIG. 4 shows illustrative programming interface 402. Programming interface 402 may include input section 406. Programming interface 402 may also include output section 408. Programming interface 402 may be utilized to enter the image data into the database, query the database and retrieve results from the database as discussed above in connection with FIG. 2.

The database may already contain the image data prior to the execution of the query presented in FIG. 4. Input section 406 shows a query being transmitted to the database. Line 141, of input section 406, directs the query to retrieve the information or images from the "banking" index and the "accountreceivable" type. Line 141 states that this input will be a search. Line 143 states that this input will be a query. Line 144 states that the query will be a Boolean query. Line 145 states that this Boolean query should be boosted, or made more important from other queries in this entry, by a variable of ten. This means that this subquery should be ten times more important than the remaining queries in the input.

Line 146 states that the following criterion should be correct—i.e., if the following criterion is incorrect, or it weighs against the result but is not a definitive "not" for inclusion in the result set. The key word "should" is different from the key word "must". The key word "must" means that if the criterion is not found in a specific image, the image should not be displayed as a result.

Line 158 states that one criterion will be a "match_phrase" criterion. This may mean that the phrase "ABC Corporation", included in variable "query", line 150, should contain a match in the "payee" field of the result, shown at line 149. This "match_phase" criterion may be boosted with a boost of 2, as shown at line 151.

Line 156 states that one criterion will be a "match_int" criterion. This may mean that the amount "100.00", included in variable "query", line 158, should contain one hundred in the "amount" field of the result. See line 157.

The output of the query may be shown in output section 408. Output section 408 may include the amount of time the query took to receive its result, 7 milliseconds. See line 2. Output section 408 may also include whether the system timed out before the query was complete. See line 3. Output section may also include the amount of shards, ten, eight of which were successful and two of which were unsuccessful. See lines 4-7.

Output section 408 may also display the hits, or results of the query. See line 9. The total number of results may be 7. See line 10. The maximum relevance score may be 0.07633021. See line 11.

The results may be displayed in a subsection hits, see line 12.

The first result may be included in the "banking" index and the "accountsreceivable" type. See lines 14-15. The identification number of the result may be 26000579. See line 16. The relevance score of the result may be 0.07633021. See line 17. The score may be computed relevance score based on a variety of elements. The payee of the document may be "ABC Corporation". See line 19. The amount of the document may be 101.00. See line 20.

The second result may be included in the "banking" index and the "accountsreceivable" type. See lines 29-30. The identification number of the result may be 34000555. See line 31. The relevance score of the result may be 0.0231126. See line 32. The payee of the document may be "ACC Corp." See line 35. The amount of the document may be 98.50. See line 35.

Figure 5:
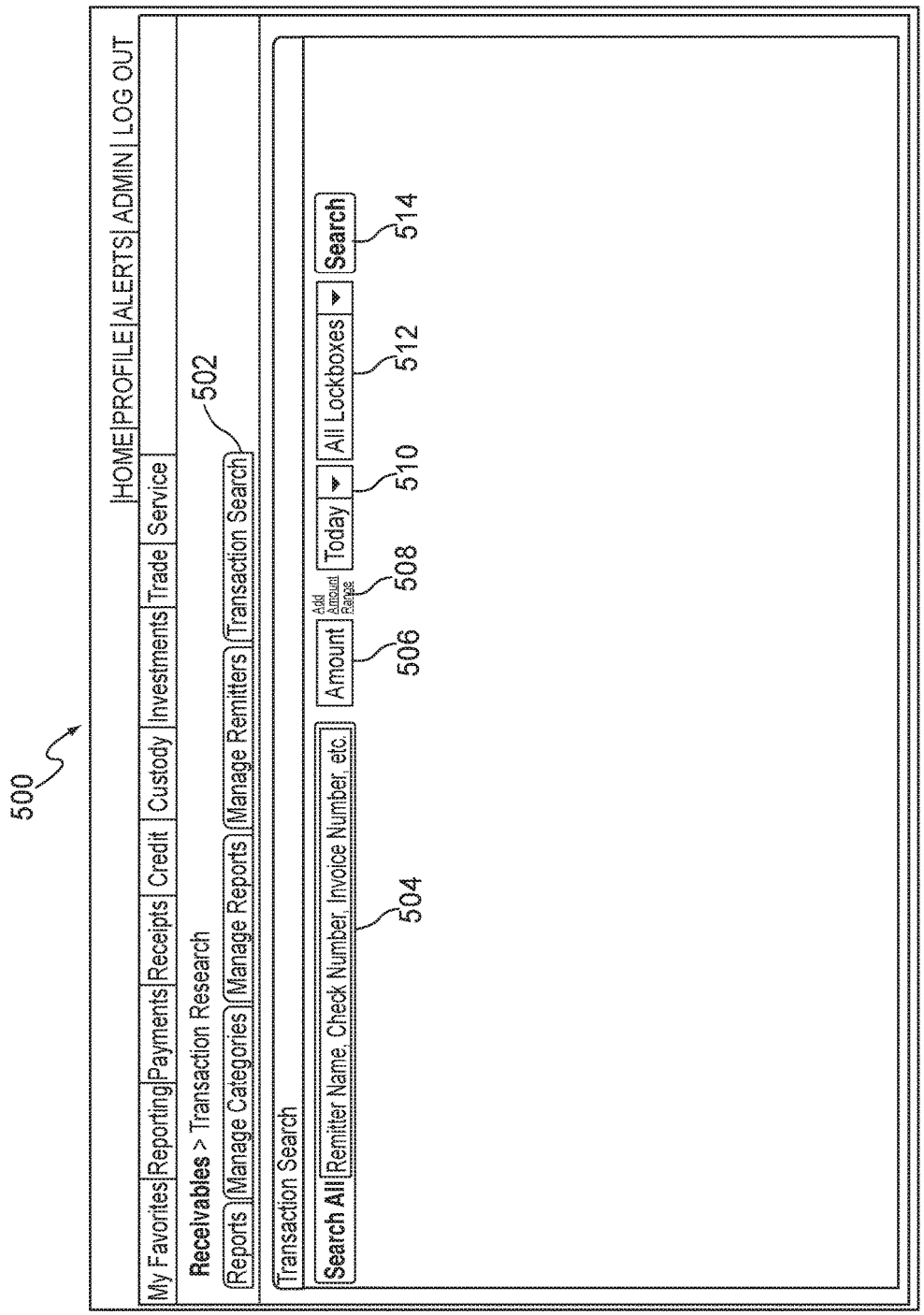
FIG. 5 shows an illustrative graphical user interface ("GUI") in accordance with principles of the invention.

FIG. 5 shows illustrative GUI 500. GUI 500 may be open to transaction search tab 502. The GUI may also include search box 504. A user may be able to enter data into search box 504. Search box 504 may accept remitter name data, check number data, invoice number data or any other suitable search data.

The GUI may include amount box 506. Amount box 506 may accept amount data. The GUI may also include add amount range button 508. Add amount range button 508 may enable a user to enter an amount range.

The GUI may include date entry selector 510. Date entry selector 510 may enable a user to choose a date. The GUI may also include lockbox selector 512. Lockbox selector 512 may enable a user to choose a lockbox. The entries placed into search box 504, amount box 506, add amount range button 508, date entry selector 510 and lockbox selector 512 may determine a query. A user may select search button 514 to execute the query.

It should be appreciated that the information placed into GUI 500 may be used to construct a computer-readable language query, as shown in FIG. 4. The constructed computer-readable language query may typically be unavailable to an average system user. This may be because an average system user may be unable to understand the computer-readable language query. Therefore, GUI 500 may be used to enable an average system user to create a query, by entering data into GUI 500, which will yield the same results as the query shown in FIG. 4.

Figure 6:
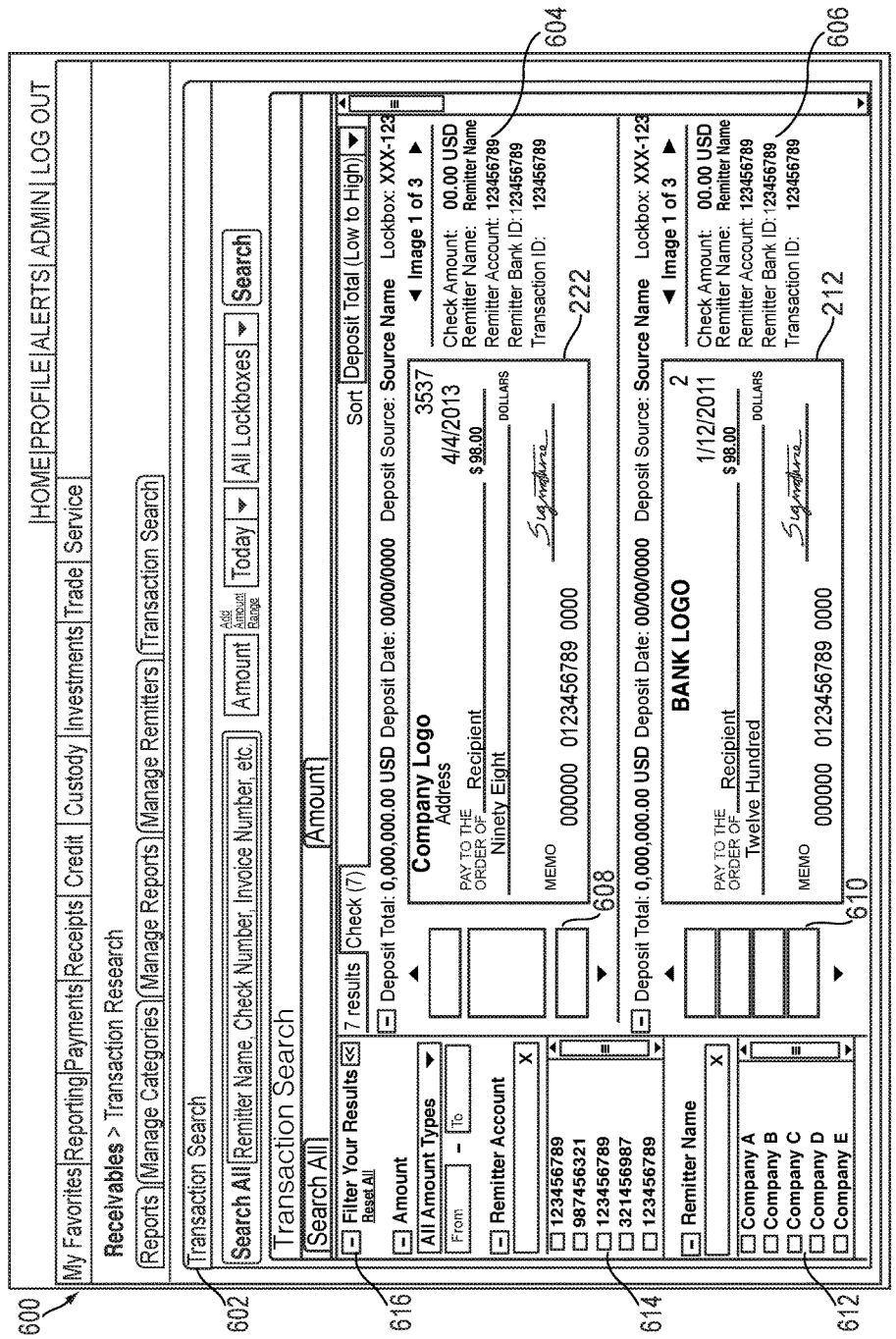
FIG. 6 shows another GUI in accordance with principles of the invention.

FIG. 6 may show illustrative GUI 600. GUI 600 may include results of a query. It should be appreciated that the results shown in GUI 600 may be the same results as the results shown in an interface similar to FIG. 4. The display of GUI 600 may enable a typical system user, who is unable to decipher the interface of FIG. 4, to view results of a query.

GUI 600 may be open to transaction search tab, as shown at 602. GUI 600 may also include region 616. Region 616 may enable a user to further narrow the query/search. For example, a user may request to view results only from a specific remitter account. Another example may be a user may request to view the results and omit a specific lockbox. The search may be narrowed by remitter account, as shown at 614. The search may also be narrowed by remitter name, as shown at 612.

GUI 600 may also include thumbnails of the displayed images, as shown at 608 and 610. It should be appreciated that each image may include more than one photograph associated with the image. For example, one displayed image may include a letter or invoice associated with the image. One displayed image may also include different photographs of the same object, e.g., the front and the back view of a check. The thumbnails may enable a viewer to view one of the images in full-size, as shown at checks 222 and 212. A viewer may also be able to toggle back and forth between the images using the thumbnail feature.

GUI 600 may also include full-size views, or near full-size vies, of the images. Checks 222 and 212 may be displayed as full-size views. GUI 600 may also include metadata associated with each image, as shown at 604 and 606. Metadata may be any data associated with the image. For example, metadata for a check may include account number, check number, remitter name, remitter account, remitter bank ID, transaction ID and any other suitable metadata.

Figure 7:
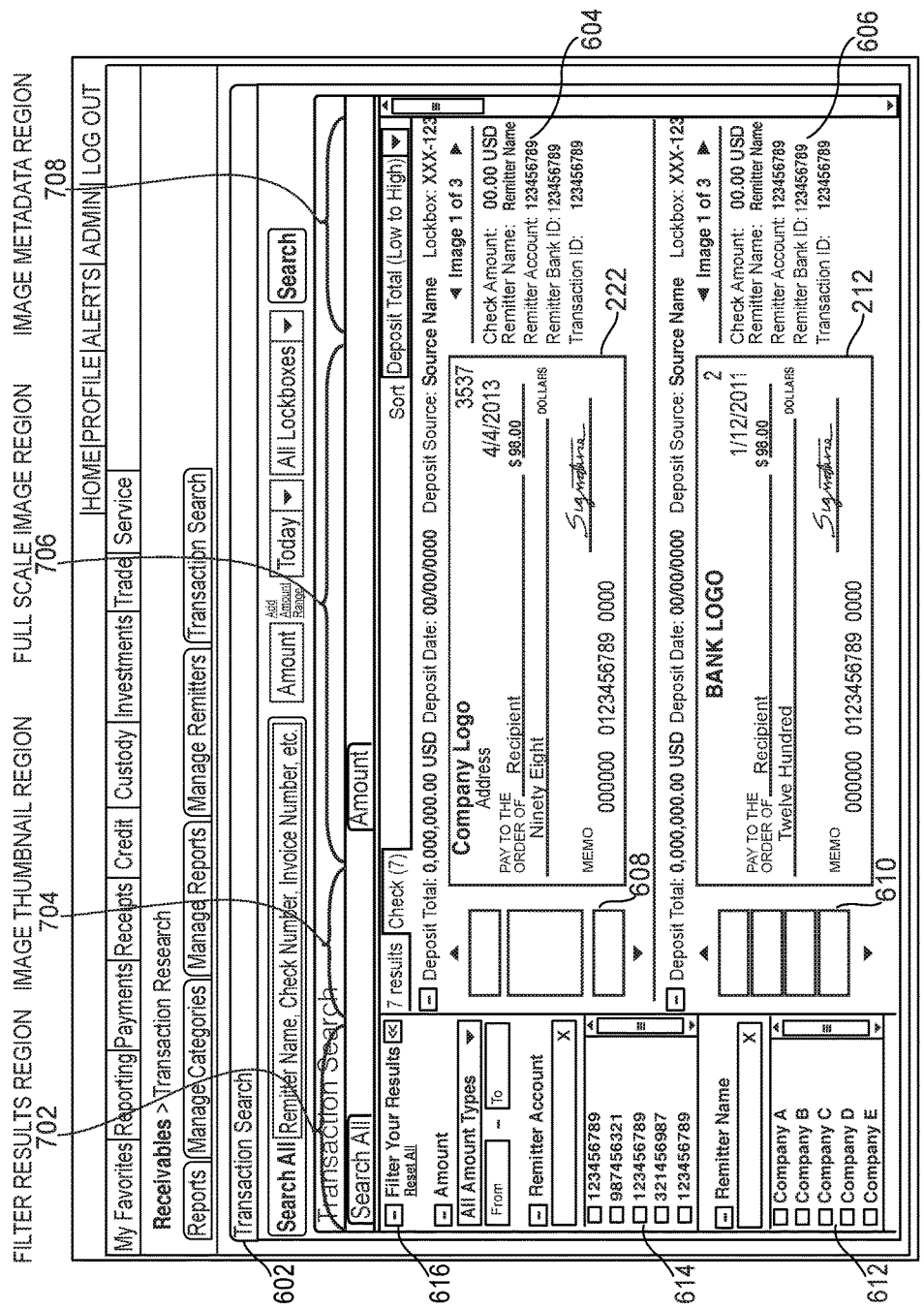
FIG. 7 shows yet another GUI in accordance with principles of the invention.

FIG. 7 shows the GUI 600. GUI 600 may be situated on a screen. The screen may preferably accommodate the display of filter results region 702, image thumbnail region 704, full-scale image region 706 and image metadata region 708.

Filter results region 702 may enable a user to filter results of the query, as shown at 616. A user may filter the results by one or more remitter accounts, as shown at 614. A user may also filter the results by one or more remitter names, as shown at 612.

Image thumbnail region 704 may include thumbnails of the images. Image thumbnail region 704 may include thumbnails 608 and 610.

Full scale image region 706 may include the full scale images. Full scale image region 706 may include checks 222 and 212.

Image metadata region 708 may include metadata about the images. Metadata 604 may include information pertaining to check 222. Metadata 606 may include information pertaining to check 212.

Figure 8:
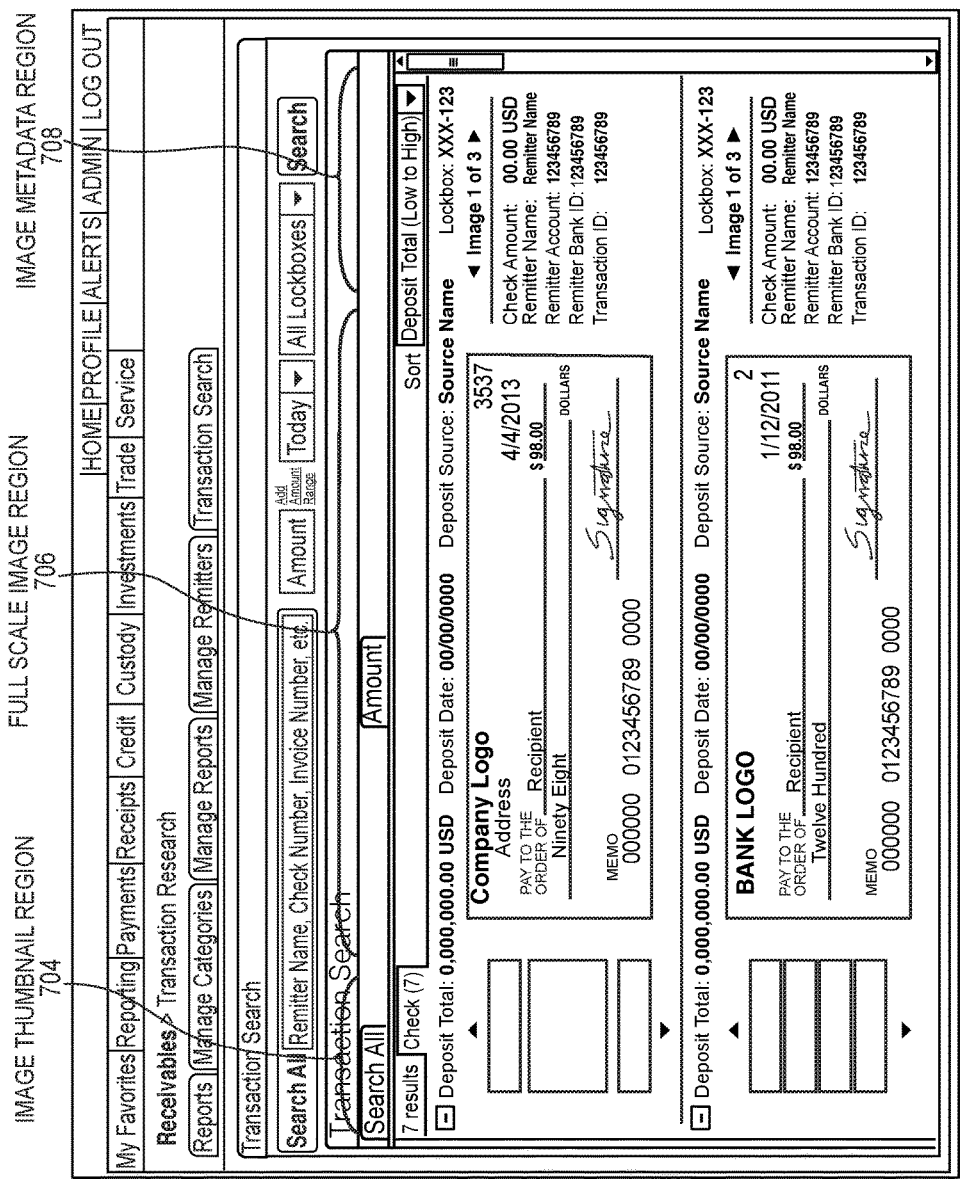
FIG. 8 shows still another GUI in accordance with principles of the invention.

FIG. 8 shows the GUI 600. In FIG. 8, there may be less room on the screen than in FIG. 7. In such a display, only image thumbnail region 704, full-scale image region 706 and image metadata region 708 may be viewable.

It should be appreciated that a physical screen and operating system display windows are two separate entities. Many times display windows may be configured to fill the entirety or most of the physical screen on which the window is displayed. Other times, a window may only fill a small percentage of the physical screen on which the window is displayed. Other times, a window may be larger than the physical screen on which it is displayed. In certain embodiments, a user may be required to view different portions of the window at different times. The regions described above may shrink and disappear depending on both the physical screen size and the operating system display windows. In an exemplary embodiment, an IPAD® may have less space on the physical screen than a 20 inch by 30 inch stand-alone monitor display screen. In another exemplary embodiment, a window displayed on an IPAD® may be larger than a window displayed on 20 inch by 30 inch stand-alone monitor display screen. In either case, the size of either the IPAD® screen or the stand-alone monitor relative to the displayed screen may cause the operating systems to either shrink on or more selected columns and/or remove the selected columns completely as per, for example, the screen compression algorithms set forth above in A and B in the summary of the disclosure section.

It should be appreciated that, at times, a window on a screen with a higher resolution may be able to host more regions than the same size window on a screen with a lower resolution. A higher resolution screen may host more regions because of the clarity or large amount of pixels included on the screen. The clarity of the screen may enable a viewer to easily view the regions, even if the regions are displayed in a smaller size than on a lower resolution screen.

It should also be appreciated, that in some embodiments, there may be stretching and/or resizing algorithms. The stretching and/or resizing algorithms may assist the system to maintain a user-friendly view of a GUI. This may include placing different components of the GUI in different places to accommodate the window shape. This may also include stretching certain portions or regions of the GUI in order to make arrange the components of the GUI in an organized manner.

Figure 9:
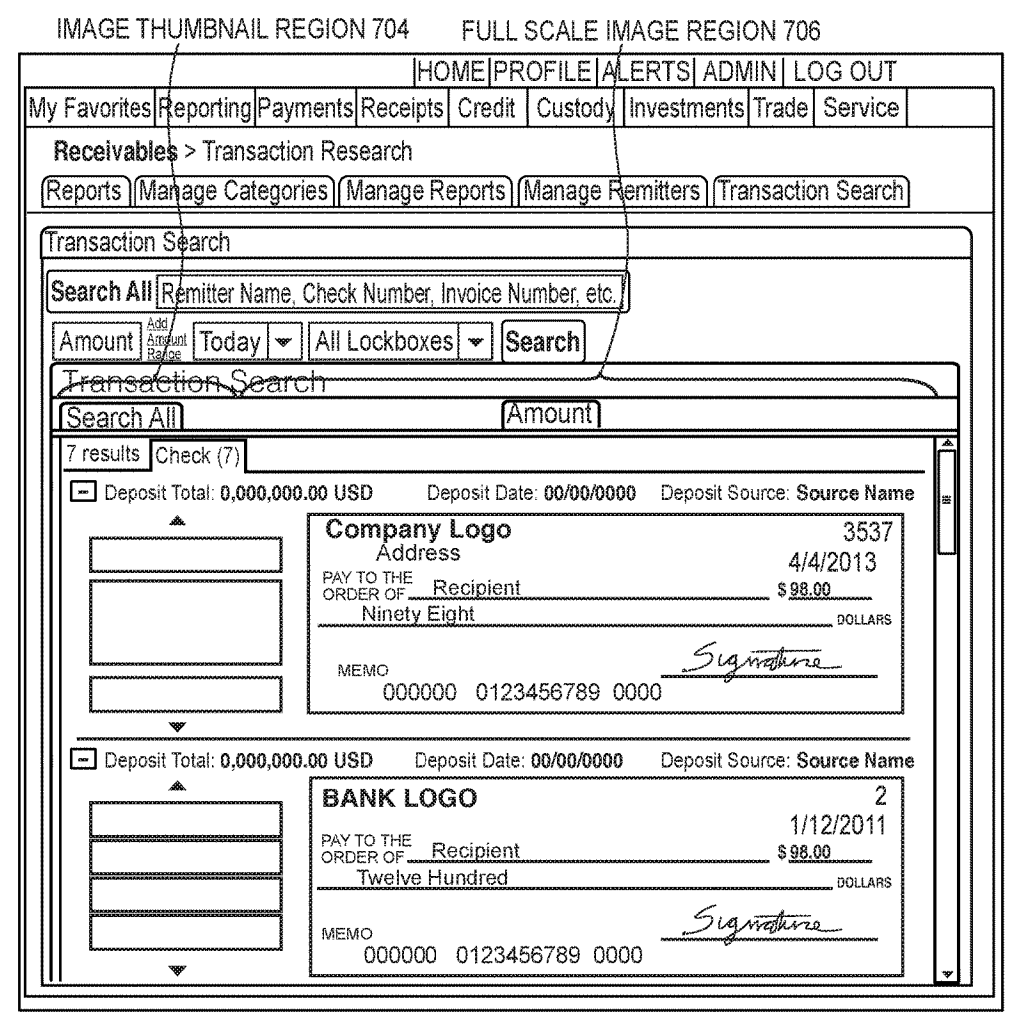

FIG. 9 shows GUI 600. In FIG. 9, there may be less room on the screen than in FIG. 8. In such a display, only image thumbnail region 704 and full-scale image region 706 may be viewable. It should be appreciated that, in some embodiments, when there is less room on GUI 600, a plurality of tabs shown at 1002 may be included in submenus included in one or two tabs. At times, tabs previously on one row may be placed on a plurality of rows, as shown at 1002. At times, tabs may be removed completely when there is minimal space in the window.

Figure 10:
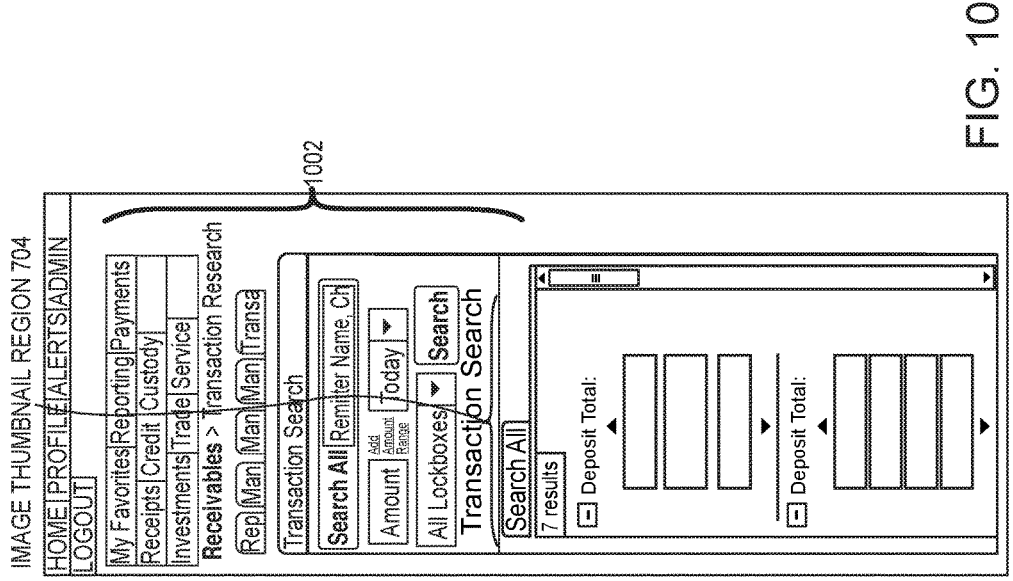
FIG. 10 shows still another GUI in accordance with principles of the invention.

FIG. 10 shows GUI 600. In FIG. 10, there may be less room on the screen than in FIG. 9. In such a display, only image thumbnail region 704 may be viewable.

Thus, methods and apparatus for image-centric, relevance-based database retrieval systems have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing relevance-based image-centric information, the method comprising:
   receiving a plurality of images;
   linking each received image, included in the plurality of images, to an appropriate standard format, wherein the appropriate standard format is selected from a plurality of standard formats, wherein the selection is based on a greatest degree of relevance between the received image and the selected one of the plurality of formats;
   converting each of the received images into a linked standard image, said linked standard image corresponding to the appropriate standard format at a higher degree of correspondence than the received image;
   loading the plurality of converted images into a database;
   searching the database utilizing a query, said query defining the searching;
   returning, in response to the query, a plurality of resultant images;
   determining a search relevance result value for each resultant image, included in the plurality of resultant images, said search relevance result value being based on a level at which the resultant image fits the query, where the most relevant resultant image is ranked highest and the least relevant resultant image is ranked lowest;
   ordering the plurality of resultant images based on all of the search relevance result values;
   loading the plurality of ordered resultant images onto a user interfacing display, wherein a first set of the plurality of images is displayed on the display prior to receiving all of the plurality of images, some resultant images are displayed while other resultant images are being loaded but not yet displayed; and
   arranging the displayed resultant images on the user interfacing display into four regions:
      an image thumbnail region comprising thumbnails of the displayed resultant images;
      a full-scale image region comprising full-size views of the displayed resultant images;
      an image metadata region comprising metadata relating to the displayed resultant images; and
      a filter results region comprising methods for narrowing the query.

2. The method of claim 1, wherein the query is a natural language query.

3. The method of claim 1, wherein the query is a structured query.

4. The method of claim 1, wherein the query is a flexible query.

5. The method of claim 1, wherein the portion of the images that are being loaded are loaded in sequences of images.

6. The method of claim 1, wherein the portion of the images that are being loaded are loaded in image clusters.

7. The method of claim 1, further comprising, based on a screen size of the user interfacing display, in order to accommodate the displayed resultant images and associated metadata, performing a screen compression algorithm that includes one or more of the following plurality of steps in the following sequence:
   shrinking the filter results region;
   removing the filter results region;
   shrinking the image metadata region;
   removing the image metadata region;
   shrinking the full-scale image region;
   removing the full-scale image region; and
   shrinking the image thumbnail region.

8. The method of claim 1, further comprising, based on a screen size of the user interfacing display, in order to accommodate the displayed resultant images and associated metadata, a screen compression algorithm that includes one or more of the following plurality of steps in the following sequence:
   shrinking the filter results region;
   shrinking the image metadata region;
   shrinking the full-scale image region;
   shrinking the image thumbnail region;
   removing the filter results region;
   removing the image metadata region; and
   removing the full-scale image region.

9. The method of claim 1, wherein the linking is based at least in part on a length and a width of the received images.

10. An apparatus for providing relevance-based image-centric information, the apparatus comprising:
    a receiver configured to receive a plurality of images;
    a processor configured to:
       link each received image, included in the plurality of received images, to an appropriate standard format, wherein the appropriate standard format is selected from a plurality of standard formats, wherein the selection is based on a greatest degree of relevance between the received image and the selected one of the plurality of formats;
       convert each of received images into a linked standard image, said linked standard image corresponding to the appropriate standard format at a higher degree of correspondence than the received image;
       load the plurality of converted images into a database;
       use a query to search the database;
    the receiver further configured to:
       receive a plurality of resultant images in response to the query;
    the processor further configured to:
       determine a search relevance result value for each resultant image, included in the plurality of resultant images, said search relevance result value being based on a level at which the resultant image fits the query, where the most relevant resultant image is ranked highest and the least relevant resultant image is ranked lowest;
order the plurality of resultant images based on all of the search relevance result values;
load the plurality of ordered resultant images onto a user interfacing display, wherein:
a first set of the plurality of images is displayed on the display prior to receiving all images included in the plurality of images; and
some resultant images are displayed while other resultant images are being loaded but not yet displayed;
arrange the displayed resultant images, and metadata associated with the displayed resultant images, on the user interfacing display into four regions:
an image thumbnail region comprising thumbnails of the displayed resultant images;
a full-scale image region comprising full-scale views of the displayed resultant images;
an image metadata region comprising metadata relating to the displayed resultant images; and
a filter results region comprising methods for narrowing the query.

11. The apparatus of claim 10, wherein the query is a natural language query.

12. The apparatus of claim 10, wherein the query is a structured query.

13. The apparatus of claim 10, wherein the query is a flexible query.

14. The apparatus of claim 10, wherein the query is an ELASTICSEARCH® query.

15. The apparatus of claim 10, wherein the portion of the images that being loaded are loaded in sequences of images.

16. The apparatus of claim 15, wherein the portion of the images that are being loaded are loaded in image clusters.

17. The apparatus of claim 10, wherein the processor is further configured to perform, based on a screen size of the user interfacing display, a screen compression algorithm that includes at least one of the following plurality of steps in the following sequence:
shrinking the filter results region;
removing the filter results region;
shrinking the image metadata region;
removing the image metadata region;
shrinking the full-scale image region;
removing the full-scale image region; and
shrinking the image thumbnail region.

18. The apparatus of claim 10, wherein the processor is further configured to perform, based on a screen size of the user interfacing display, a screen compression algorithm that includes the following plurality of steps in the following sequence:
shrinking the filter results region;
shrinking the image metadata region;
shrinking the full-scale image region;
shrinking the image thumbnail region;
removing the filter results region;
removing the image metadata region; and
removing the full-scale image region.

19. The apparatus of claim 10, wherein the linking is based at least in part on a length and a width of the received images.

* * * * *